US012800785B2

(12) United States Patent
Wu et al.

(10) Patent No.: US 12,800,785 B2
(45) Date of Patent: Nov. 17, 2026

(54) ROBUST SOURCE LOCALIZATION WITH JOINT TIME ARRIVAL AND VELOCITY ESTIMATION FOR CABLE CUT PREVENTION

(71) Applicant: NEC Laboratories America, Inc., Princeton, NJ (US)

(72) Inventors: Yifan Wu, San Diego, CA (US); Ming-Fang Huang, Princeton, NJ (US); Shaobo Han, Princeton, NJ (US); Jian Fang, Princeton, NJ (US); Yuheng Chen, South Brunswick, NJ (US); Yaowen Li, Princeton, NJ (US); Mohammad Khojastepour, Lawrenceville, NJ (US)

(73) Assignee: NEC Corporation, Tokyo (JP)

( * ) Notice: Subject to any disclaimer, the term of this patent is extended or adjusted under 35 U.S.C. 154(b) by 447 days.

(21) Appl. No.: 18/485,247

(22) Filed: Oct. 11, 2023

(65) Prior Publication Data

US 2024/0125962 A1 Apr. 18, 2024

Related U.S. Application Data

(60) Provisional application No. 63/415,713, filed on Oct. 13, 2022.

(51) Int. Cl.

*G01V 1/37* (2006.01)
*G01H 9/00* (2006.01)

(Continued)

(52) U.S. Cl.

CPC ............ *G01V 1/375* (2013.01); *G01H 9/004* (2013.01); *G01V 1/305* (2013.01); *G01V 1/307* (2013.01);

(Continued)

(58) Field of Classification Search

CPC ........ G01V 1/375; G01V 1/305; G01V 1/307; G01V 8/24; G01V 2210/21;

(Continued)

(56) References Cited

U.S. PATENT DOCUMENTS

2005/0043920 A1* 2/2005 Castiglioni .......... G02B 6/4479 702/183
2020/0172130 A1* 6/2020 Esprey .................. B61L 25/025

(Continued)

*Primary Examiner* — Manuel L Barbee
(74) *Attorney, Agent, or Firm* — Vincent Duffy

(57) ABSTRACT

Method for source localization for cable cut prevention using distributed fiber optic sensing (DFOS)/distributed acoustic sensing (DAS) is described that is robust/immune to underground propagation speed uncertainty. The method estimates the location of a vibration source while considering any uncertainty of vibration propagation speed and formulates the localization as an optimization problem, and both location of the sources and the propagation speed are treated as unknown. This advantageously enables our method to adapt to variances of the velocity and produce a better generalized performance with respect to environmental changes experienced in the field. Our method operates using a DFOS system and AI techniques as an integrated solution for vibration source localization along an entire optical sensor fiber cable route and process real-time DFOS data and extract features that are related to a location of a source of vibrations that may threaten optical fiber facilities.

6 Claims, 19 Drawing Sheets

(51) Int. Cl.
*G01V 1/30* (2006.01)
*G01V 8/24* (2006.01)

(52) U.S. Cl.
CPC ............ *G01V 8/24* (2013.01); *G01V 2210/21* (2013.01); *G01V 2210/48* (2013.01); *G01V 2210/65* (2013.01); *G01V 2210/667* (2013.01); *G01V 2210/67* (2013.01); *G01V 2210/72* (2013.01); *G01V 2210/74* (2013.01)

(58) Field of Classification Search
CPC ........... G01V 2210/48; G01V 2210/65; G01V 2210/667; G01V 2210/67; G01V 2210/72; G01V 2210/74; G01H 9/004
See application file for complete search history.

(56) References Cited

U.S. PATENT DOCUMENTS

2021/0180997 A1* 6/2021 Huang ............... G01D 5/35361
2021/0278314 A1* 9/2021 Xia ......................... G01M 7/00
2023/0025986 A1* 1/2023 Xia ........................ G01H 9/004

* cited by examiner

ROBUST SOURCE LOCALIZATION WITH JOINT TIME ARRIVAL AND VELOCITY ESTIMATION FOR CABLE CUT PREVENTION

CROSS-REFERENCE TO RELATED APPLICATIONS

This application claims the benefit of U.S. Provisional Patent Application Ser. No. 63/415,713 filed Oct. 13, 2022, the entire contents of which is incorporated by reference as if set forth at length herein.

FIELD OF THE INVENTION

This application relates to distributed fiber optic sensing (DFOS) systems, methods, and structures. More particularly, it pertains to source localization with joint time arrival and velocity estimation for cable cut prevention using distributed fiber optic sensing (DFOS)/distributed acoustic sensing (DAS).

BACKGROUND OF THE INVENTION

To support 5G and beyond networks, there are many optical fibers buried underground that serve a significant role for essential communications. However, many construction activities (especially machine digging) may cut an optical fiber cable and produce a network outage. Hence, it is critical for service providers to protect optical fiber facilities since every fiber cut event will induce down time, raise maintenance cost and potentially impact a service provider's SLA (service level agreement) penalty. Currently, there is no satisfactory solution to prevent optical fiber cable cuts unless one follows the well-known 811 tickets and physically marks out cable locations. Distributed fiber optic sensing (DFOS) techniques provide a continuous monitoring along the entire cable route and detect the construction actions in early stage to prevent the cable cut and protect the fiber.

SUMMARY OF THE INVENTION

The above problems are solved and an advance in the art in is made according to aspects of the present disclosure directed to source localization for cable cut prevention using distributed fiber optic sensing (DFOS)/distributed acoustic sensing (DAS).

In sharp contrast to the prior art, we describe a method to localize construction activities from distributed fiber optic sensing data. Unlike earlier methods that suffer from uncertainties resulting from changing underground propagation speed of sound/vibration that can change significantly with changes in temperature and humidity, our inventive method according to the present disclosure is robust/immune to this underground propagation speed uncertainty.

According to aspects of the present disclosure, if an activity that threatens an underground facility is occurring close to an optical fiber, an alarm is signaled to stop construction activities. As a result, the optical fiber(s) threatened by the proximate construction activities are not damaged.

According to further aspects of the present disclosure, our inventive method estimates the location of a vibration source while considering any uncertainty of vibration propagation speed.

In further contrast to the prior art—which assumed a known propagation speed and are "blind" to environmental changes—our inventive method formulates the localization as an optimization problem, and both location of the sources and the propagation speed are treated as unknown. This advantageously enables our method to adapt to variances of the velocity and produce a better generalized performance with respect to environmental changes experienced in the field.

Our systems and methods include a DFOS system and AI techniques as an integrated solution for vibration source localization along an entire optical sensor fiber cable route. As we shall show and describe further, our inventive systems and methods process real-time DFOS data and extract features that are related to a location of a source of vibrations that may threaten optical fiber facilities. Our processing framework is based on a physical propagation model that incorporates: an uncertainty of the underground propagation velocity wherein we formulate a novel feature space that includes both the velocity and distance. The distance of the vibration source from the optical sensor fiber and underground wave propagation velocity are jointly considered in our optimization framework which simultaneously estimates the distance of the source of the vibrations and the underground wave propagation velocity. Advantageously, our inventive systems and methods provide a model that generalizes environmental changes and unknown sources and is robust to traffic noises and optical sensor fiber noises.

DETAILED DESCRIPTION OF THE INVENTION

Figure 1A:
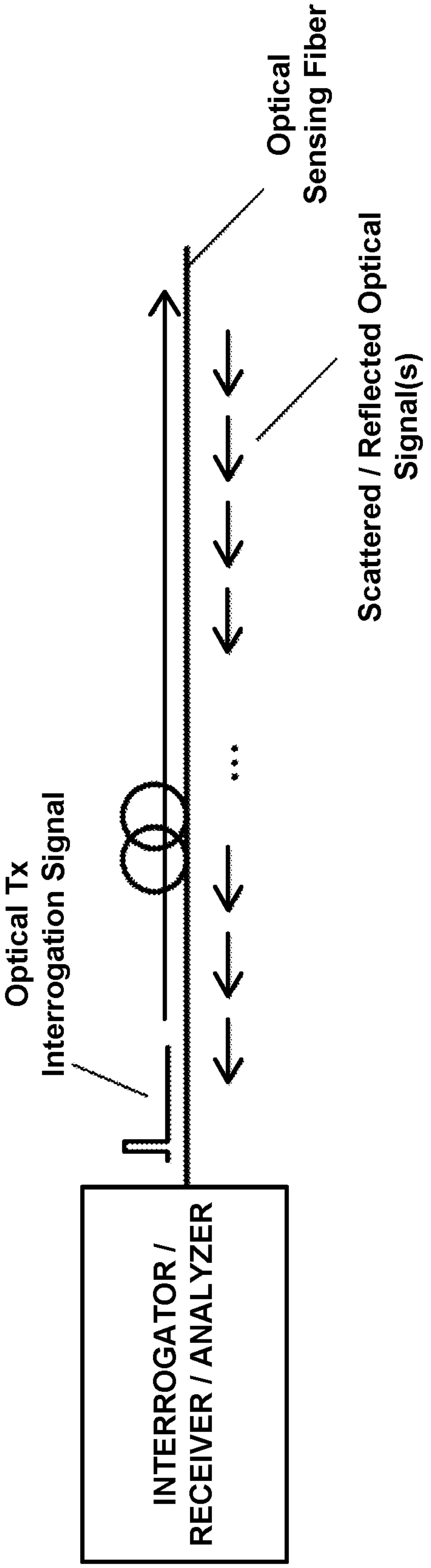
Prior Art FIG. 1(A)
FIG. 1(A) and FIG. 1(B) are schematic diagrams showing an illustrative prior art uncoded and coded DFOS systems.

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor (s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we note that distributed fiber optic sensing systems interconnect optoelectronic integrators to an optical fiber (or cable), converting the fiber to an array of sensors distributed along the length of the fiber. In effect, the fiber becomes a sensor, while the interrogator generates/injects laser light energy into the fiber and senses/detects events along the fiber length.

As those skilled in the art will understand and appreciate, DFOS technology can be deployed to continuously monitor vehicle movement, human traffic, excavating activity, seismic activity, temperatures, structural integrity, liquid and gas leaks, and many other conditions and activities. It is used around the world to monitor power stations, telecom networks, railways, roads, bridges, international borders, critical infrastructure, terrestrial and subsea power and pipelines, and downhole applications in oil, gas, and enhanced geothermal electricity generation. Advantageously, distributed fiber optic sensing is not constrained by line of sight or remote power access and—depending on system configuration—can be deployed in continuous lengths exceeding 30 miles with sensing/detection at every point along its length. As such, cost per sensing point over great distances typically cannot be matched by competing technologies.

Distributed fiber optic sensing measures changes in "backscattering" of light occurring in an optical sensing fiber when the sensing fiber encounters environmental changes including vibration, strain, or temperature change events. As noted, the sensing fiber serves as sensor over its entire length, delivering real time information on physical/environmental surroundings, and fiber integrity/security. Furthermore, distributed fiber optic sensing data pinpoints a precise location of events and conditions occurring at or near the sensing fiber.

Figure 1B:
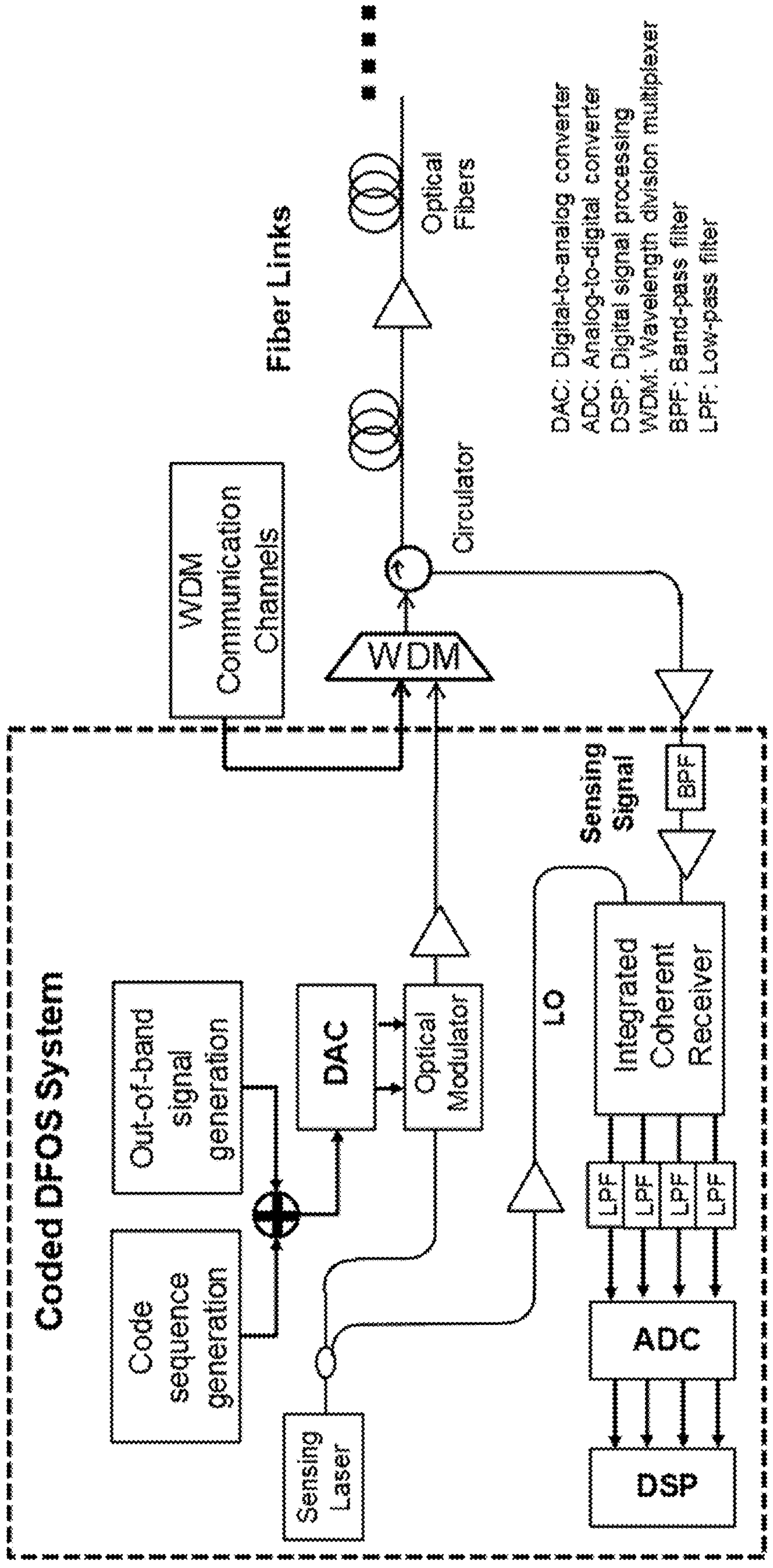
Prior Art FIG. 1(B)

A schematic diagram illustrating the generalized arrangement and operation of a distributed fiber optic sensing system that may advantageously include artificial intelligence/machine learning (AI/ML) analysis is shown illustratively in FIG. 1(A). With reference to FIG. 1(A), one may observe an optical sensing fiber that in turn is connected to an interrogator. While not shown in detail, the interrogator may include a coded DFOS system that may employ a coherent receiver arrangement known in the art such as that illustrated in FIG. 1(B).

As is known, contemporary interrogators are systems that generate an input signal to the optical sensing fiber and detects/analyzes reflected/backscattered and subsequently received signal(s). The received signals are analyzed, and an output is generated which is indicative of the environmental conditions encountered along the length of the fiber. The backscattered signal(s) so received may result from reflections in the fiber, such as Raman backscattering, Rayleigh backscattering, and Brillion backscattering.

As will be appreciated, a contemporary DFOS system includes the interrogator that periodically generates optical pulses (or any coded signal) and injects them into an optical sensing fiber. The injected optical pulse signal is conveyed along the length optical fiber.

At locations along the length of the fiber, a small portion of signal is backscattered/reflected and conveyed back to the interrogator wherein it is received. The backscattered/reflected signal carries information the interrogator uses to detect, such as a power level change that indicates—for example—a mechanical vibration.

The received backscattered signal is converted to electrical domain and processed inside the interrogator. Based on the pulse injection time and the time the received signal is detected, the interrogator determines at which location along the length of the optical sensing fiber the received signal is returning from, thus able to sense the activity of each location along the length of the optical sensing fiber. According to aspects of the present disclosure, classification methods may be further used to detect and locate events or other environmental conditions including acoustic and/or vibrational and/or thermal along the length of the optical sensing fiber.

Figure 2:
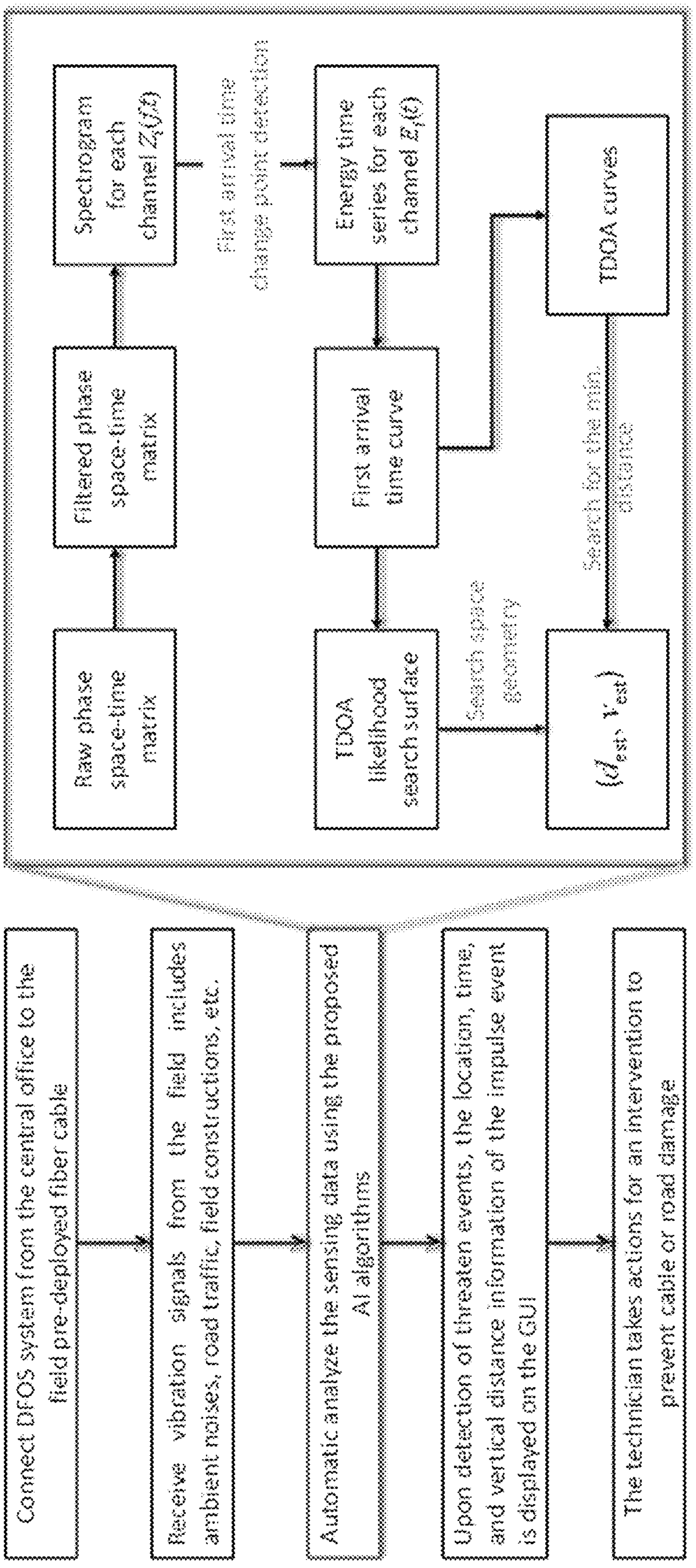
FIG. 2. Is a schematic flow diagram showing an illustrative method of source localization with joint time arrival according to aspects of the present disclosure.

FIG. 2. Is a schematic flow diagram showing an illustrative method of source localization with joint time arrival according to aspects of the present disclosure.

Figure 3:
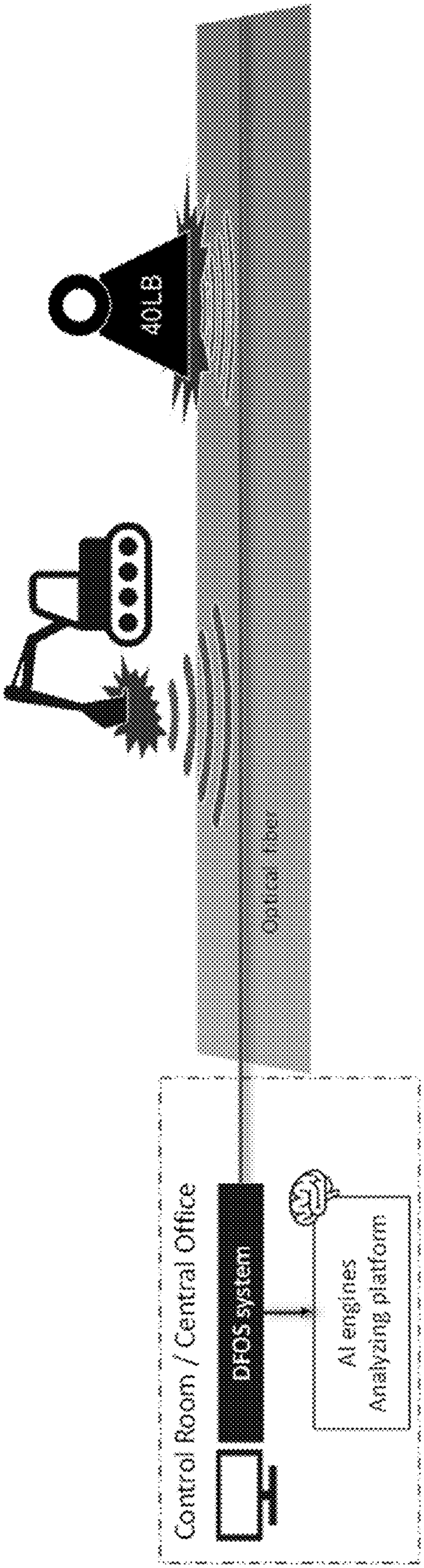
FIG. 3 is a schematic diagram showing illustrative experimental setup according to aspects of the present disclosure.

FIG. 3 is a schematic diagram showing illustrative experimental setup according to aspects of the present disclosure. As shown in this figure, a sensing layer is overlaid on a testbed optical sensor fiber. The distributed fiber optic sensing system (DFOS) can advantageously operate as a distributed acoustic sensing (DAS) system and/or distributed vibration sensing (DVS) system and is in a control office/central office for remote monitoring of entire optical fiber cable route.

Simulate the Machine Digging Activities

The DFOS system is connected to optical sensing fiber to provide sensing functions in long-term and real-time. The optical sensing fiber can be a dark fiber (no telecommunications traffic) or an operational fiber carrying telecommunications traffic to/from telecommunications service providers. In this disclosure, we are focusing on machine digging activities which as will be known to those skilled in the art, is a considerable threat to the underground optical fiber cable. Due to the limitation of the test equipment, we evaluate our methodology by dropping a 40 LB weight plate to simulate the impulse signals of a machine digging.

Obtain the Raw Phase Space-Time Matrix from the DFOS

As those skilled in the art will understand and appreciate, signals received from DFOS system operation is a complex multi-channel time series. Suppose there are N time samples and M channels, the signal received is a complex matrix with dimension N×M. We extract the phase information of the complex matrix for further processing.

Bandpass Filtering and Phase Unwrap

Figure 4:
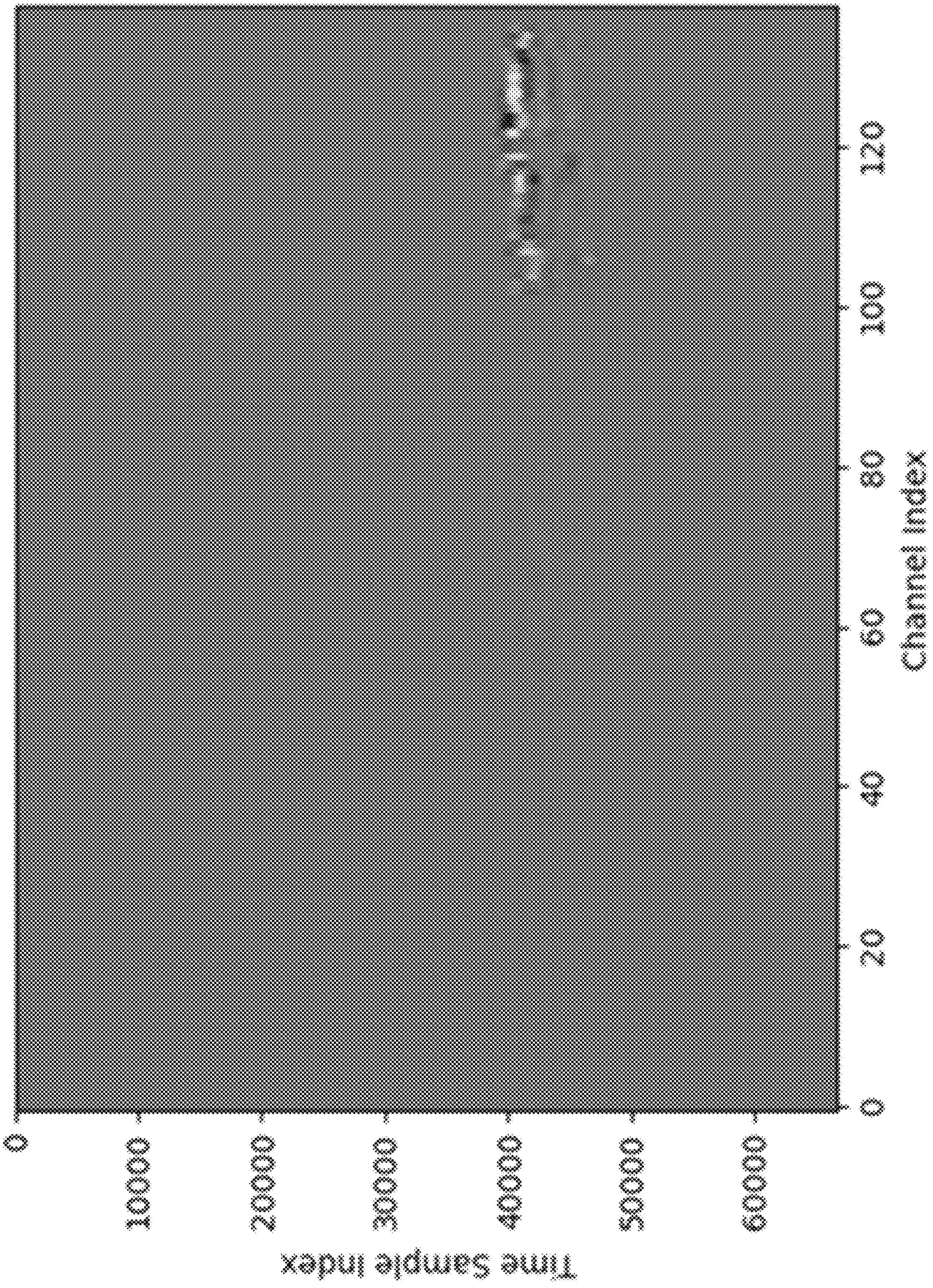
FIG. 4 is a plot showing an illustrative space-time matrix after filtering and phase unwrapping according to aspects of the present disclosure.

To remove artifacts from a DC component and compensate for the phase change for intense activities, we apply filtering and unwrapping the phase matrix we just obtained. The space-time matrix for an impulse event after filtering and phase unwrapping can be visualized as FIG. 4, which is a plot showing an illustrative space-time matrix after filtering and phase unwrapping according to aspects of the present disclosure. From FIG. 4, the drop event takes place around the time sample index 40000. The channels between #100 to #135 which cover the aera of ~28.5 m have obvious responses to this event.

Time-Frequency Analysis and Spectrogram Computation

Figure 5:
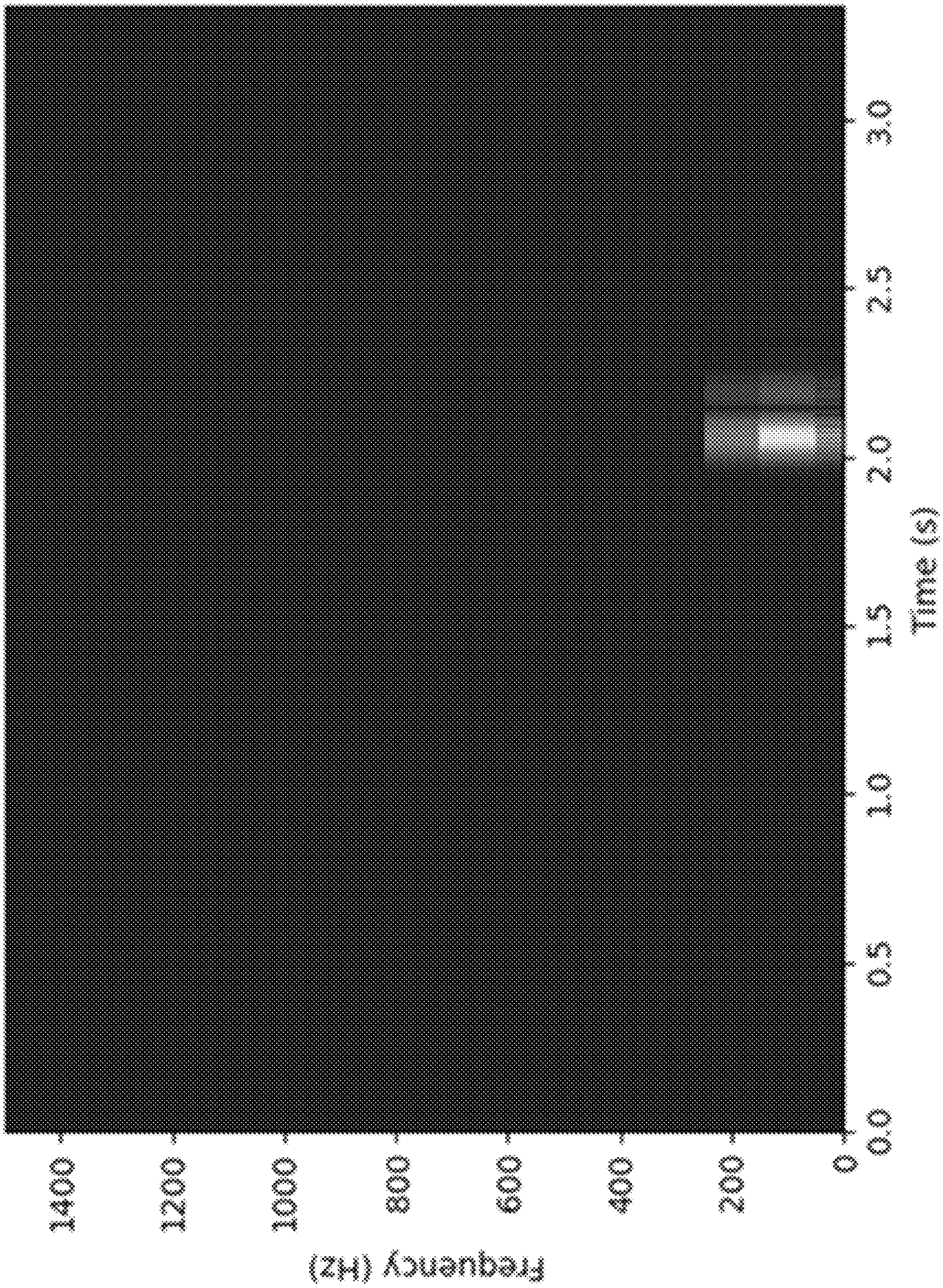
FIG. 5 is a plot showing an illustrative spectrogram for one channel in the space-time matrix according to aspects of the present disclosure.

A short-time Fourier transform (STFT) is applied to a selected set of channels of the (filtered and unwrapped) space-time matrix. FIG. 5 is a plot showing an illustrative spectrogram for one channel in the space-time matrix according to aspects of the present disclosure. FIG. 5 shows the absolute value of the spectrogram for channel #132. From this figure, the drop event begins around 2 s, and the active frequencies are mostly concentrated below 200 Hz.

Energy Time Series for Each Channel

For each channel, we sum the spectrogram across frequencies and obtain the energy time series. The energy time series for channel #132 can be plotted as shown in FIG. 6 which is a plot showing an illustrative energy time series for channel #132 according to aspects of the present disclosure.

Figure 6:
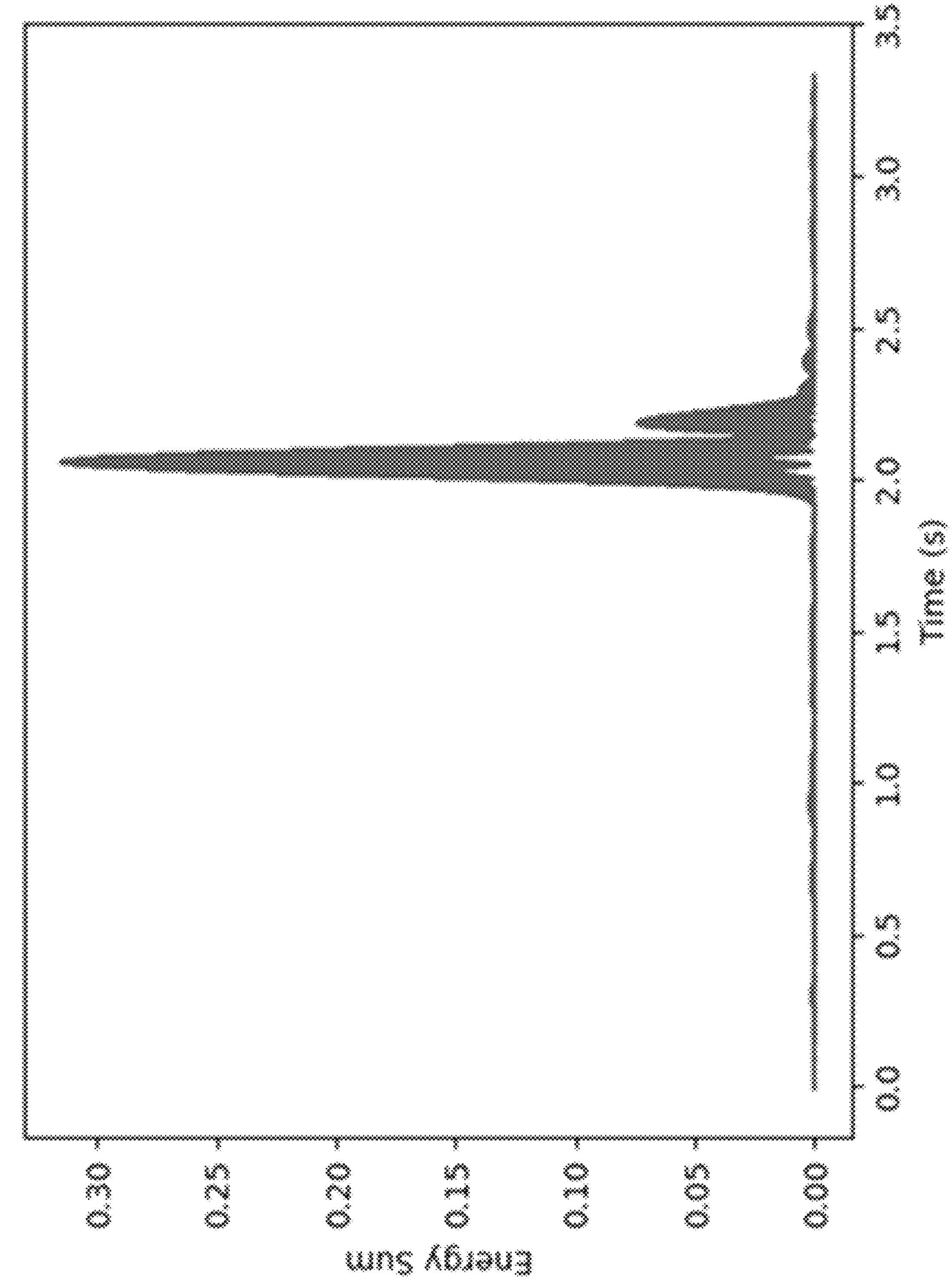
FIG. 6 is a plot showing an illustrative energy time series for channel #132 according to aspects of the present disclosure.

In FIG. 6, we can clearly see the transition from a pre-event region to an event region. In the pre-event region, the energy sum time series is dominated by the noise while there is a sharp transition when the event begins.

First Arrival Time Curve

Figure 7A:
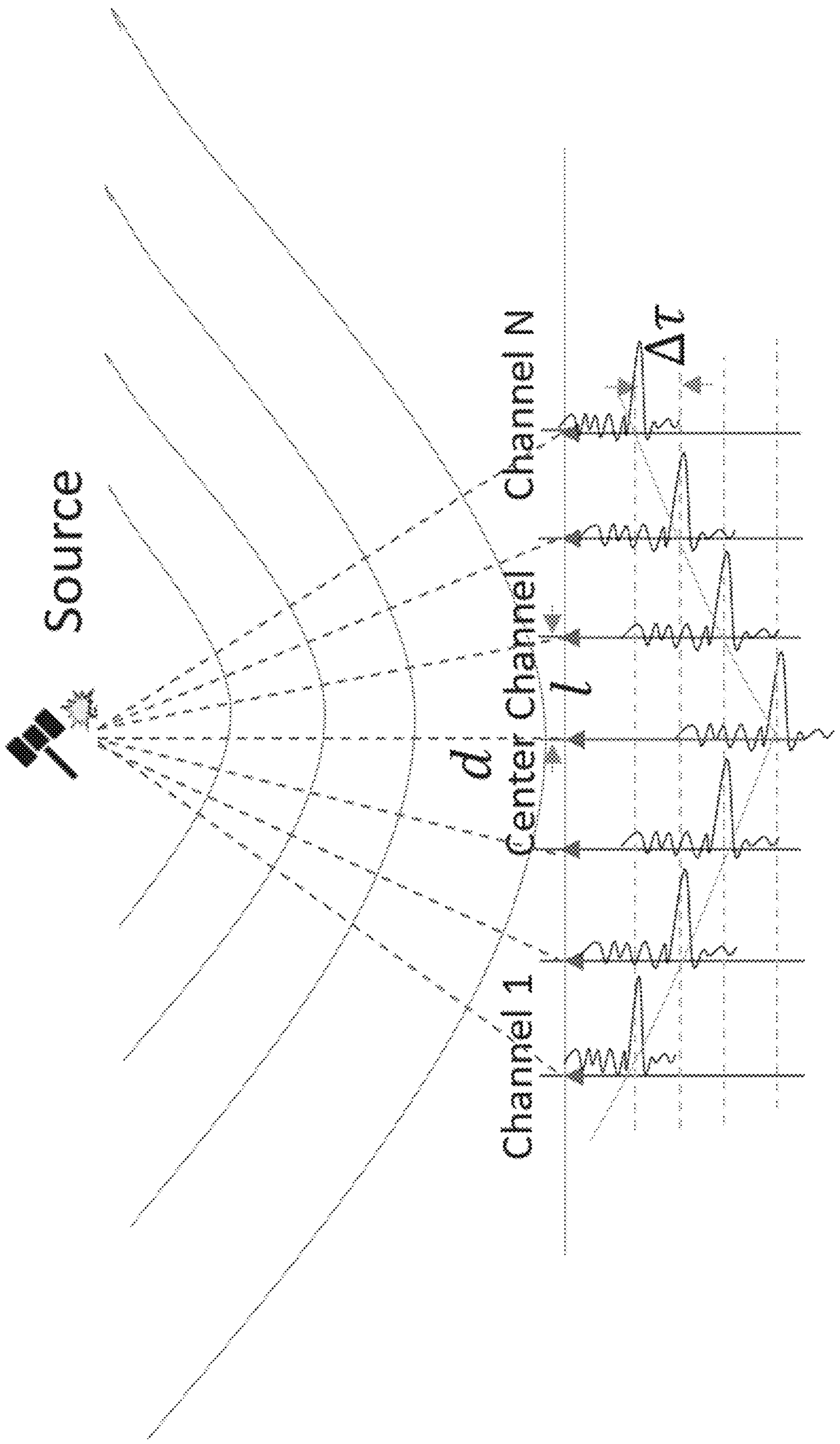
FIG. 7(A) is a schematic diagram showing illustrative wave propagation model and first-time arrival to an optical sensor fiber according to aspects of the present disclosure.
Figure 7B:
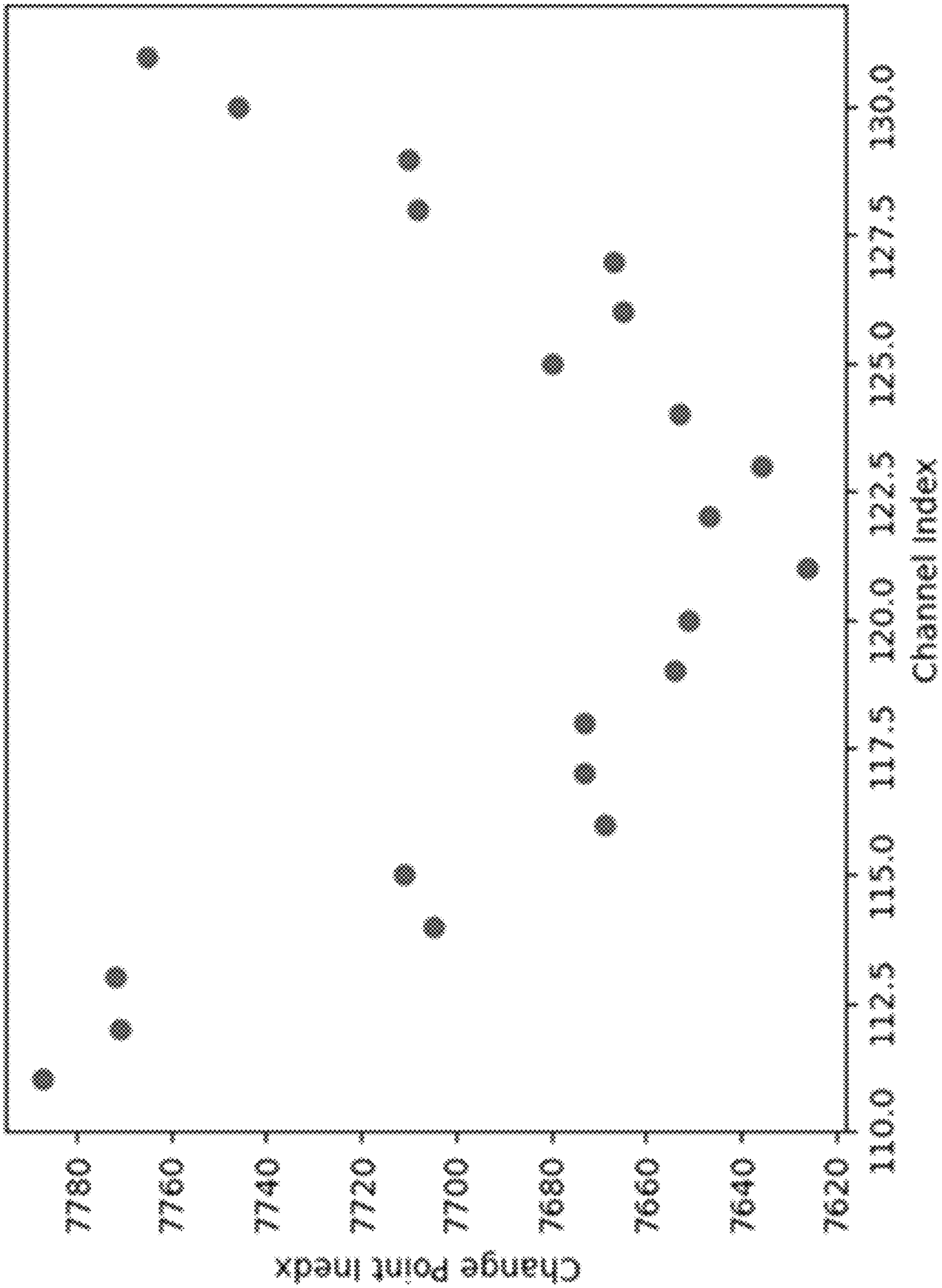
FIG. 7(B) is a plot showing illustrative change point scatter for channels #111-#132 according to aspects of the present disclosure.

We perform a change point detection technique based on thresholding the absolute value of first-order differences to capture the first arrival time for channels #111-#132 and plot the change points for these channels. The wave propagation model and the first arrival estimation are shown in FIG. 7(A) which is a schematic diagram showing illustrative wave propagation model and first-time arrival to an optical sensor fiber according to aspects of the present disclosure. FIG. 7(B) is a plot showing illustrative change point scatter for channels #111-#132 according to aspects of the present disclosure. From FIG. 7(B), we note that channel #121 is likely to be the one that is closest to the source since it arrives earlier than other channels. It serves as an important reference point, and we refer to it as the "center channel." By plotting the change points, we obtain the center sensor index.

TDOA Curve

Figure 8:
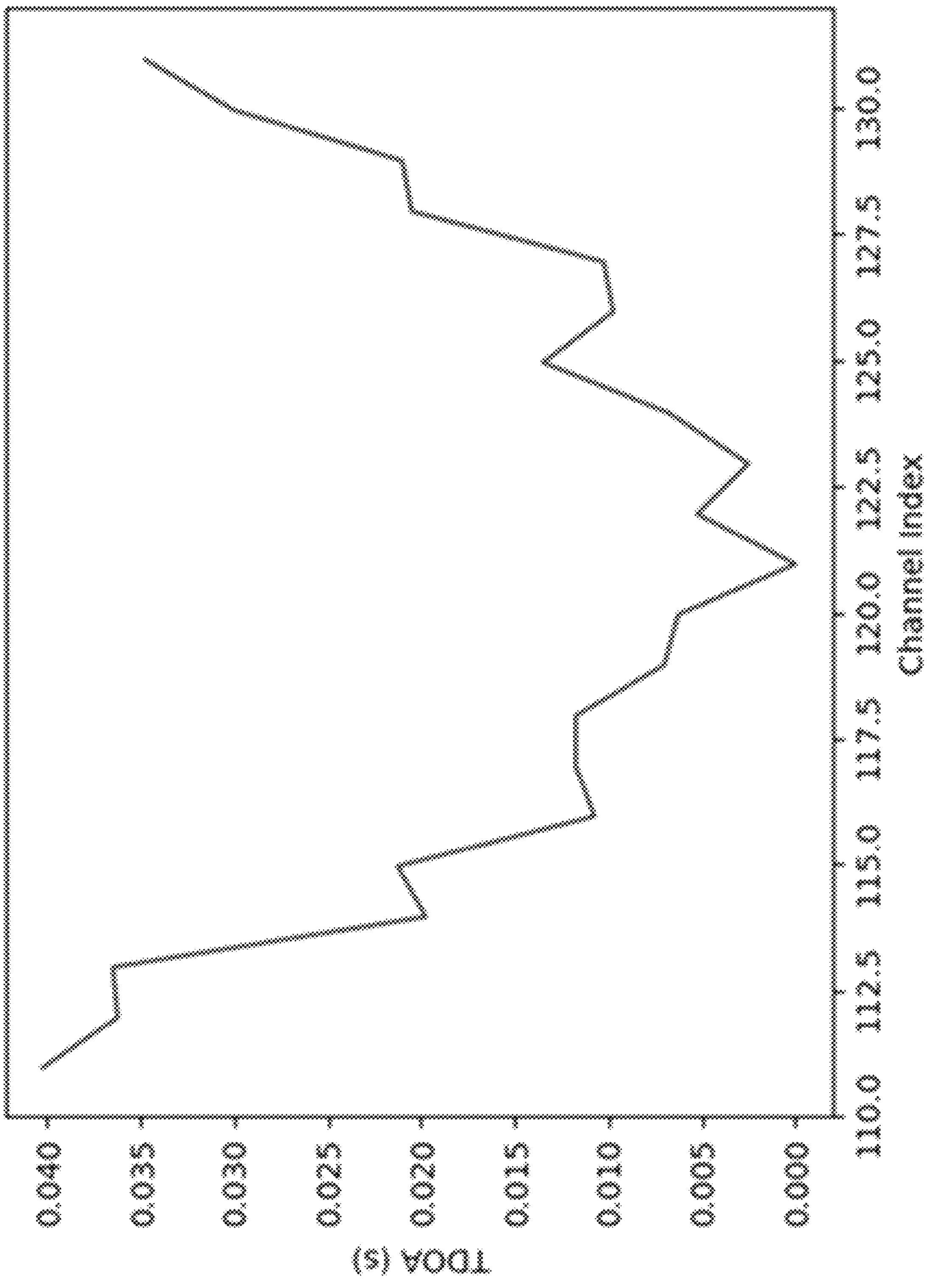
FIG. 8 is a plot showing ensemble approach robust to outliers according to aspects of the present disclosure.

With the help of the change point plot, we can compute the time difference of arrival (TDOA) for each channel relative to the center channel. For the center channel, the TDOA is supposed to be 0. The TDOA curve can be plotted as shown in FIG. 8, which is a plot showing ensemble approach robust to outliers according to aspects of the present disclosure.

An Ensemble Approach Robust to Outliers

We note that some of the change points may be affected by the noise. Therefore, we can exclude them in the fitting likelihood surface computation part. Instead of designing a dedicated outlier removal approach, we propose a random sampling technique, and only ¾ of the channels will be randomly selected in each round. This can be viewed as an ensemble approach which can provide both point estimates of the unknown parameters and their confidence intervals. We will execute this procedure for 50 rounds and record the estimation results for each round.

TDOA Fitting Likelihood Surface and Parameter Estimation

Figure 9:
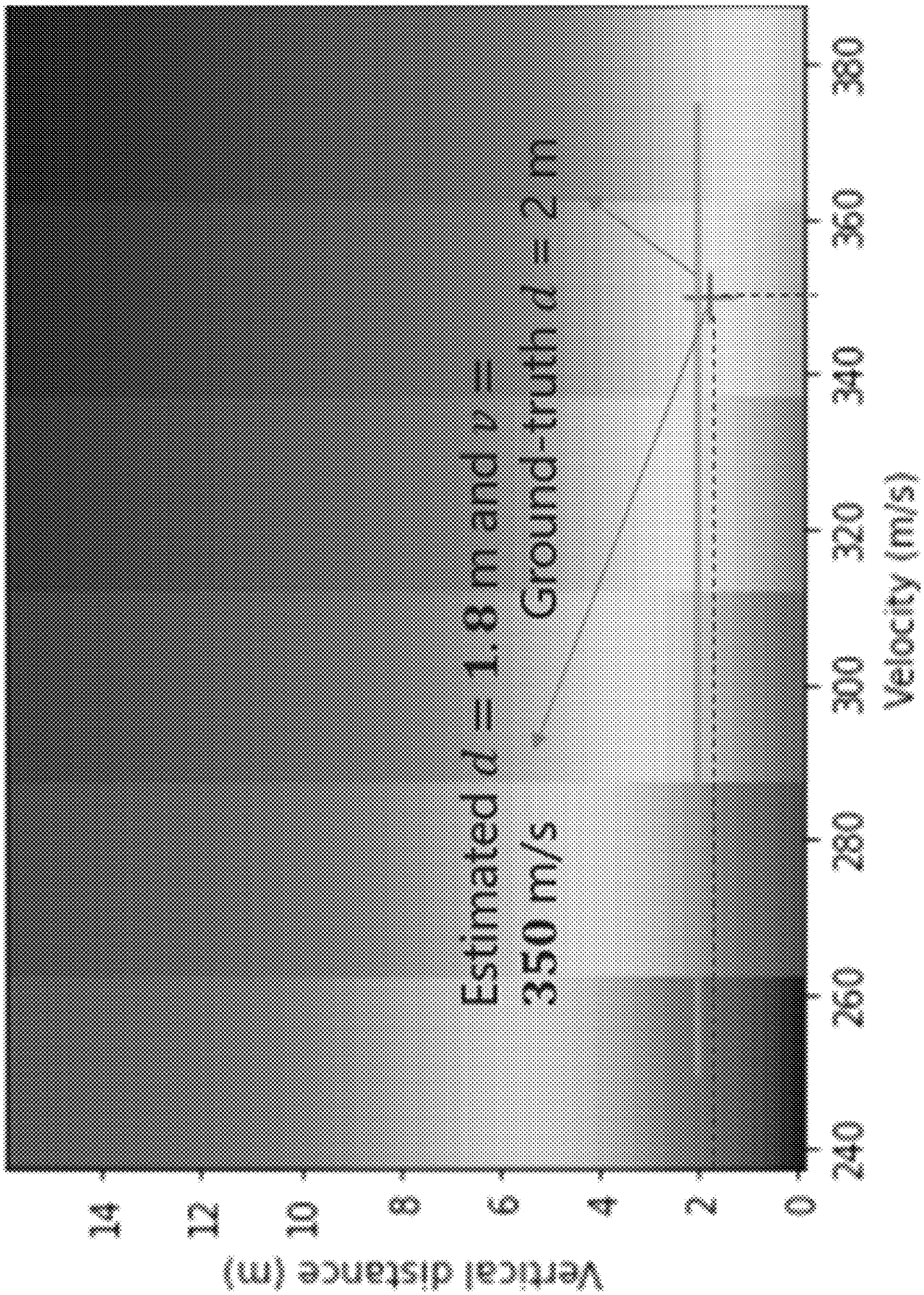
FIG. 9 is a plot showing an illustrative TDOA fitting likelihood surface according to aspects of the present disclosure.

Based on the center channel and the geometry, and if the underground wave propagation speed is known, we can obtain the theoretical TDOA curve. However, to incorporate the uncertainty of the propagation speed, we need to compute the theoretical TDOA curve for each candidate propagation speed. Then, we compute the difference between the TDOA curve obtained previously with the theoretical TDOA curve under different candidate propagation speeds and form a likelihood surface. The minima in the likelihood surface will be an estimation of the vertical distance and velocity. FIG. 9 shows the inverse of the likelihood surface (the inverse of the minima will become the maxima) and FIG. 9 is a plot showing an illustrative TDOA fitting likelihood surface according to aspects of the present disclosure.

Therefore, the estimated vertical distance and underground wave propagation velocity are 1.8 m, and 350 m/s, respectively (as "+" indicates in the figure). The ground-truth vertical distance is 2 m (shown as the horizontal line).

Figure 10:
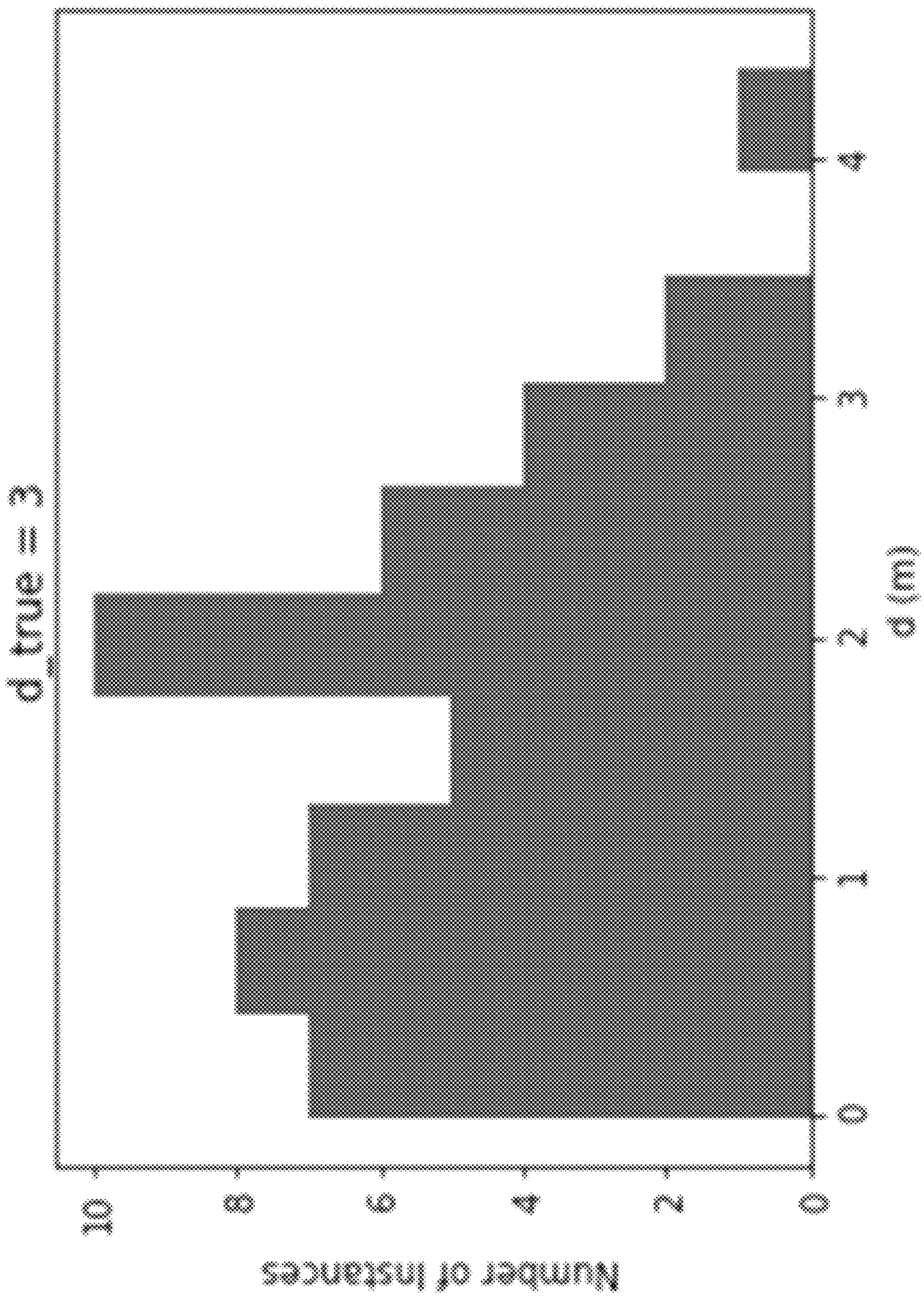
FIG. 10 is a plot showing an illustrative histogram of the distance estimation for 50 rounds according to aspects of the present disclosure.
Figure 11A:
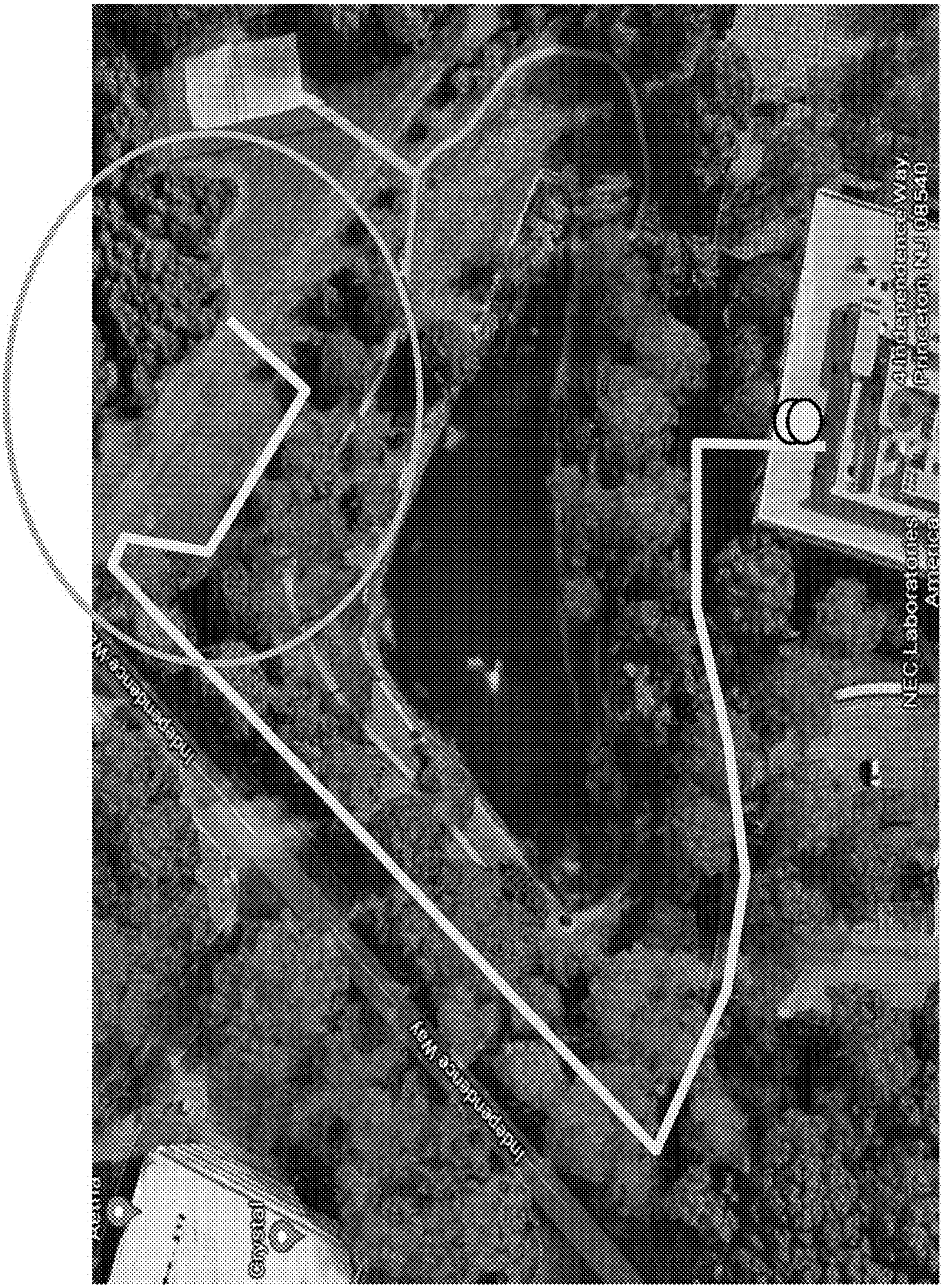
FIG. 11(A) is a photo-illustration showing an illustrative test bed layout according to aspects of the present disclosure.
Figure 11B:
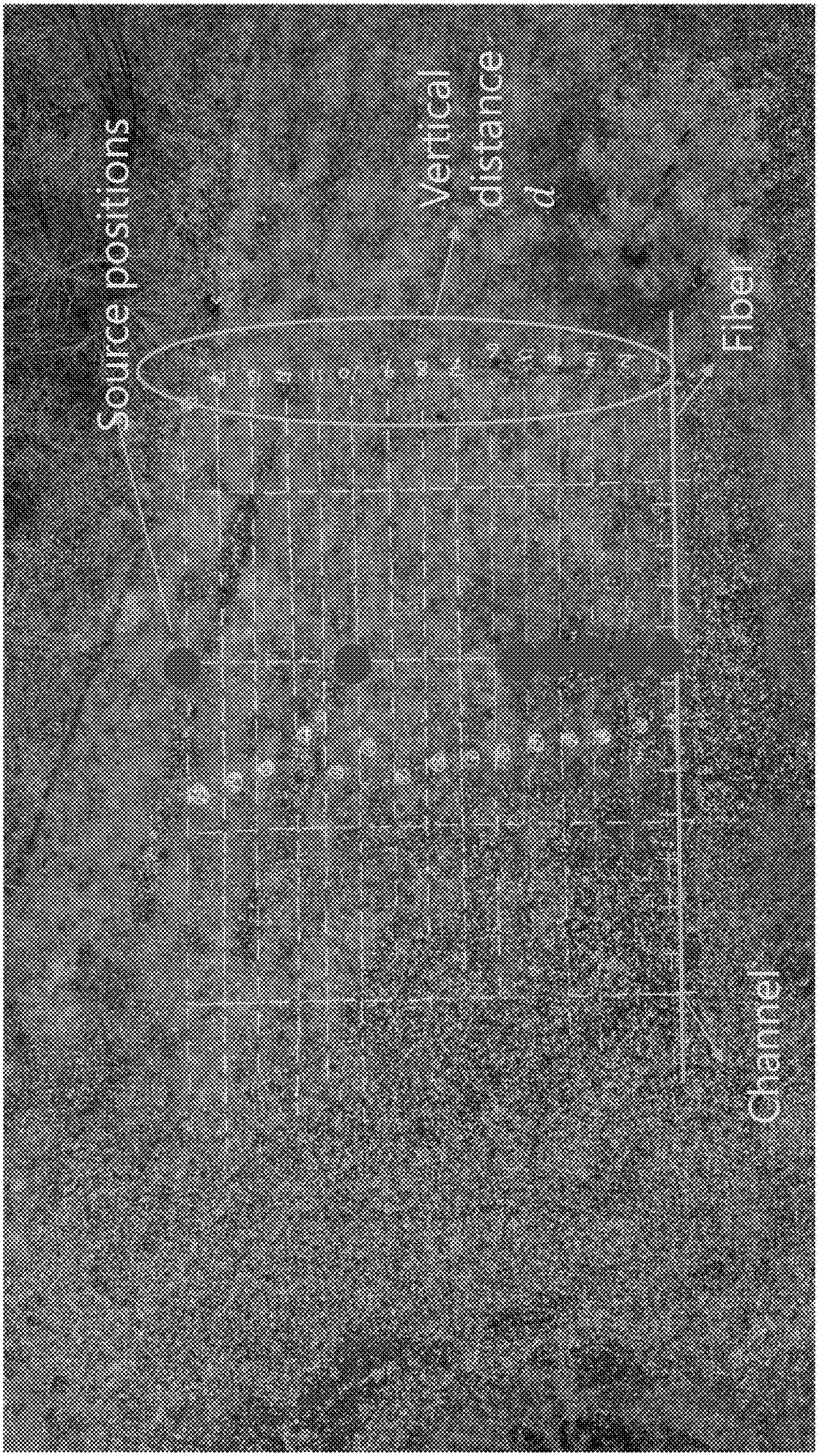
FIG. 11(B) is a photo-illustration showing illustrative data collection points of the test bed of FIG. 11(A) according to aspects of the present disclosure.

In addition, to examine the effectiveness of the random sampling method, we plot the histogram of the estimated d for the 50 rounds. FIG. 10 is a plot showing an illustrative histogram of the distance estimation for 50 rounds according to aspects of the present disclosure. From FIG. 10, the ground-truth distance lies in one of the bins in the histogram. The bin that has the greatest number of instances is 2 m, which is close to the ground-truth distance. This indicates the random sampling technique can obtain an accurate estimation of the distance Experimental Results We evaluated our inventive method based on the weight drop signal under the sampling frequency 20 kHz. The data are collected in the test bed shown in FIG. 11(A) and FIG. 11(B). FIG. 11(A) is a photo-illustration showing an illustrative test bed layout according to aspects of the present disclosure. FIG. 11(B) is a photo-illustration showing illustrative data collection points of the test bed of FIG. 11(A) according to aspects of the present disclosure.

Initially, we examine the mean absolute error (MAE) of the proposed method. The following table lists the MAE for the case when random sampling is applied or not applied. Since we are more concerned with the localization performance of the sources within 5 m, we separately evaluate these testing points. In addition, the performance without random sampling (RS) and with RS are also compared.

TABLE 1

| | <5 m MAE (M) | Overall, MAE (m) |
|---|---|---|
| w/o RS | 1.75 | 3.03 |
| w/RS | 1.01 | 2.73 |

From Table 1, the proposed method can achieve an accurate estimation for the source within 5 m and RS can improve the performance. In addition, we examine the alarm detection performance of the method.

Figure 12A:
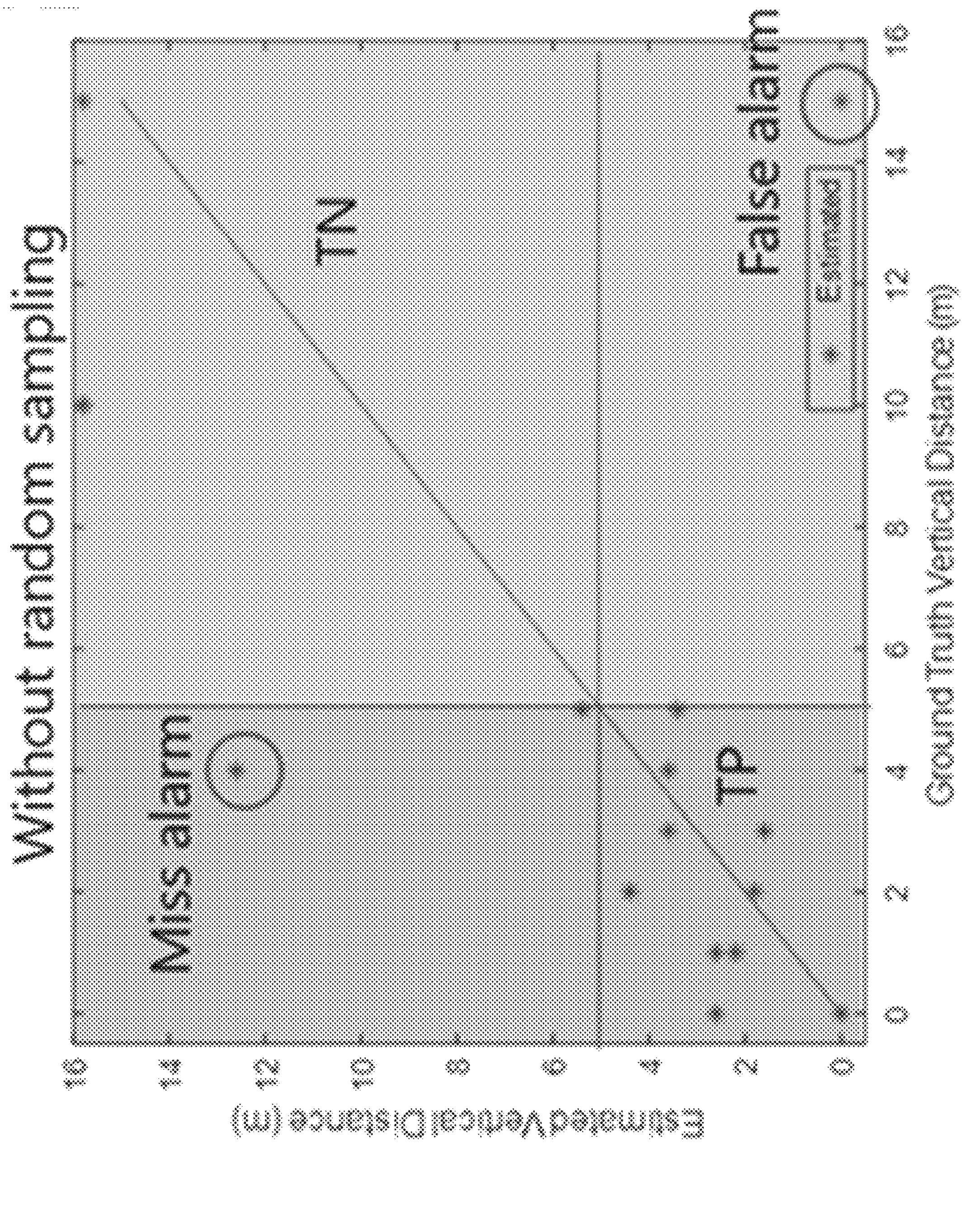
FIG. 12(A) is a plot showing an illustrative alarm detection performance with RS for the weight drop test according to aspects of the present disclosure.
Figure 12B:
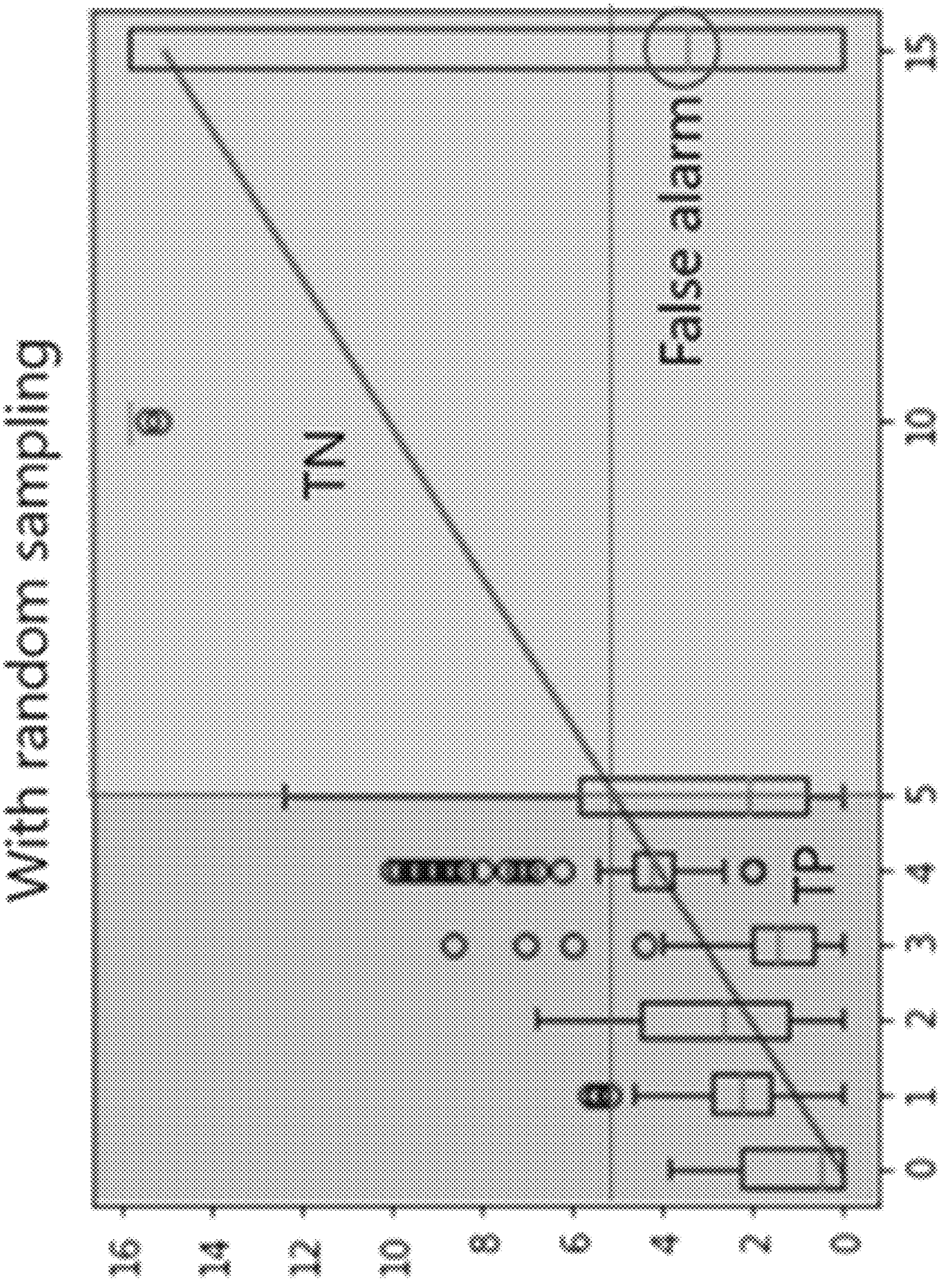
FIG. 12(B) is a plot showing an illustrative alarm detection performance with random sampling for the weight drop test according to aspects of the present disclosure.

FIG. 12(A) is a plot showing an illustrative alarm detection performance with RS for the weight drop test according to aspects of the present disclosure. FIG. 12(B) is a plot showing an illustrative alarm detection performance with random sampling for the weight drop test according to aspects of the present disclosure.

From FIG. 12(A) and FIG. 12(B), our method has a false alarm rate (FAR) 1/16 and miss alarm rate (MAR) 1/16 if RS is absent and the MAR can be reduced to 0 if RS is applied.

Figure 13A:
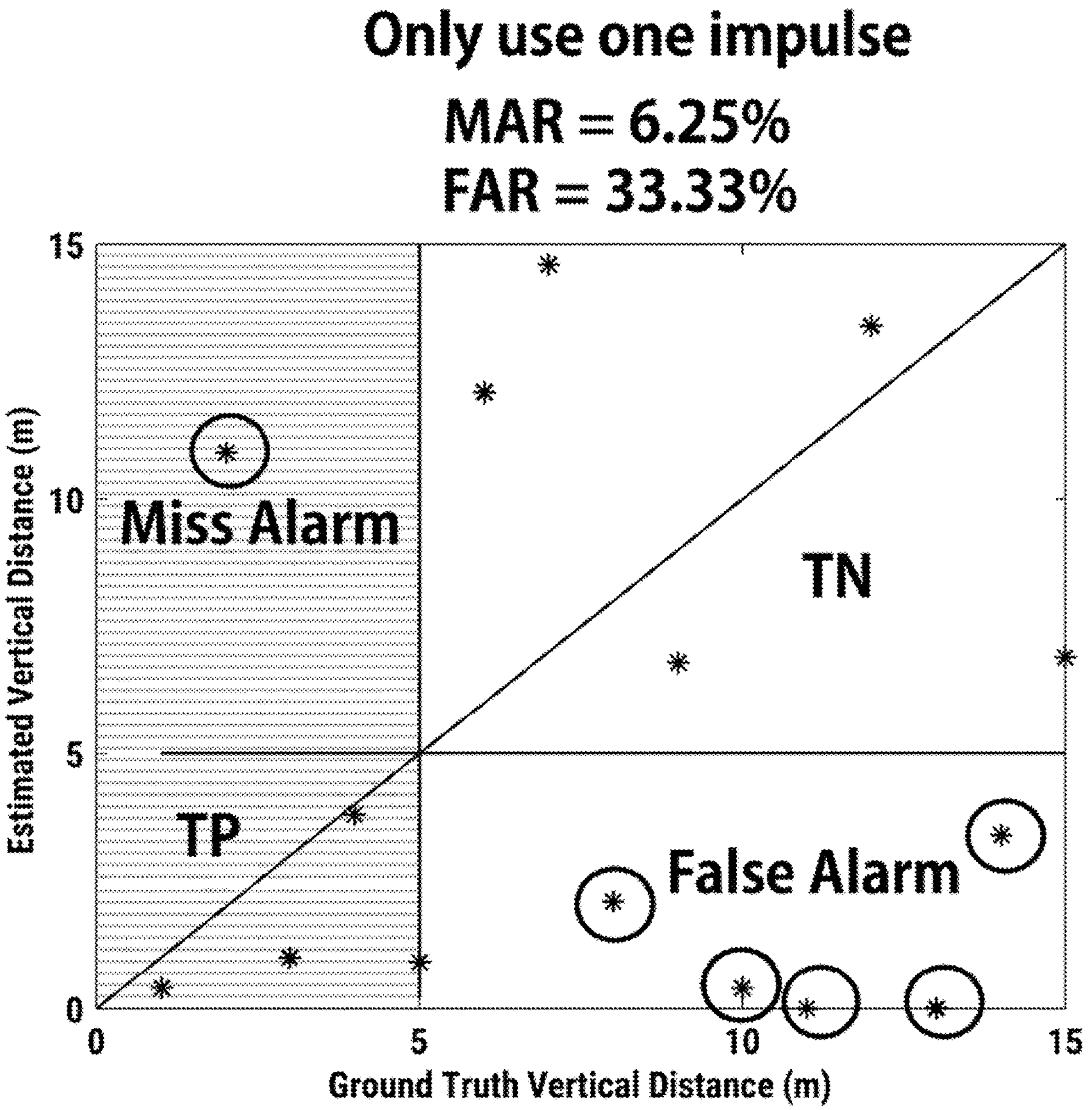
FIG. 13(A) is a plot showing an illustrative alarm detection performance for the tampering impulse—only use one impulse—according to aspects of the present disclosure.
Figure 13B:
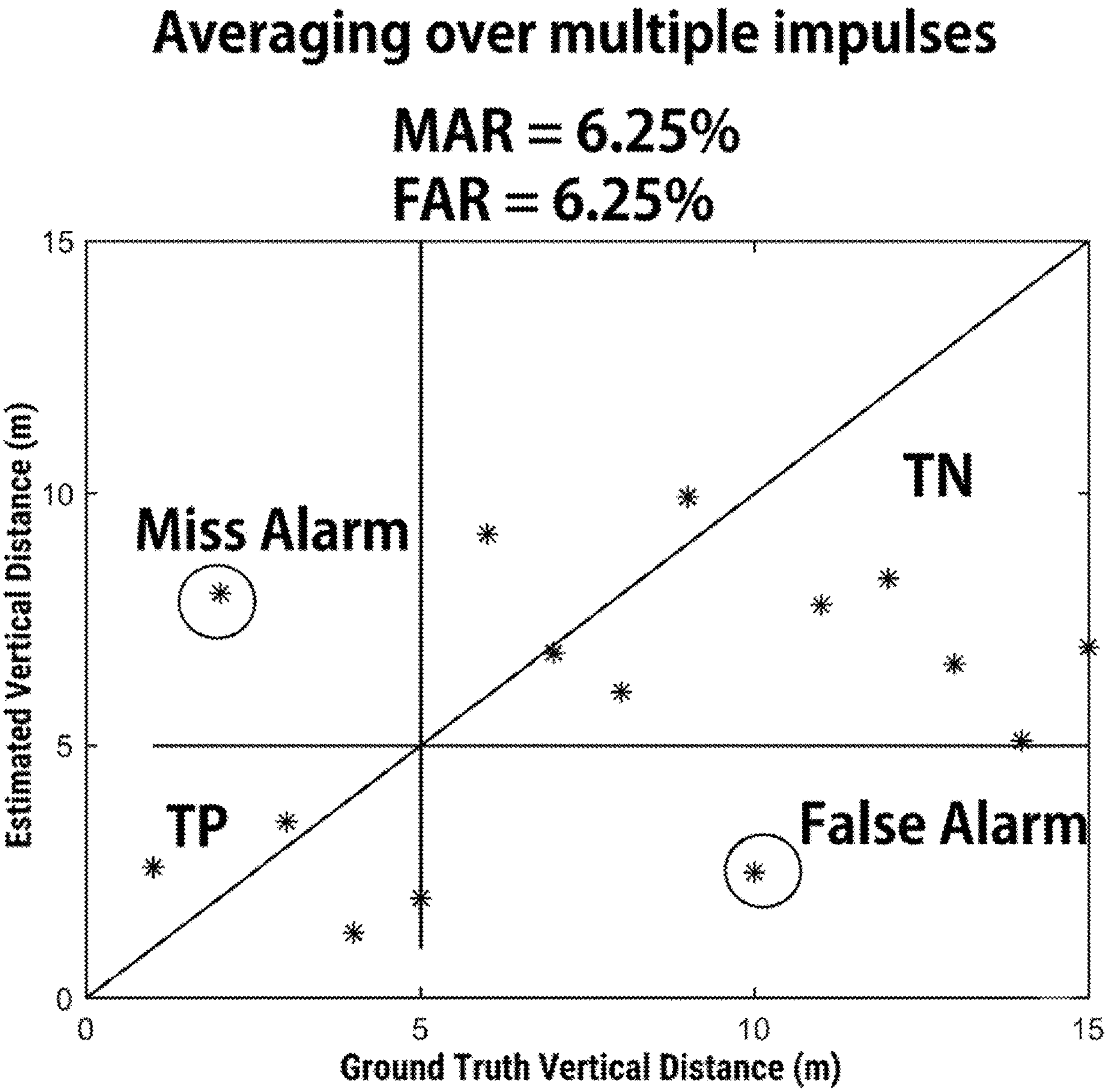
FIG. 13(B) is a plot showing an illustrative alarm detection performance for the tampering impulse—averaging over multiple impulses—according to aspects of the present disclosure.

Finally, we examine the generalization performance of the proposed method. We collect the data for another day which has different weather and ground conditions. Therefore, the propagation speed is different from the previous test. Besides, instead of using weight drop as the exciting impulse, we use a tamper to hit the ground to generate the impulse FIG. 13(A) is a plot showing an illustrative alarm detection performance for the tampering impulse—only use one impulse—according to aspects of the present disclosure. FIG. 13(B) is a plot showing an illustrative alarm detection performance for the tampering impulse—averaging over multiple impulses—according to aspects of the present disclosure.

Figure 14:
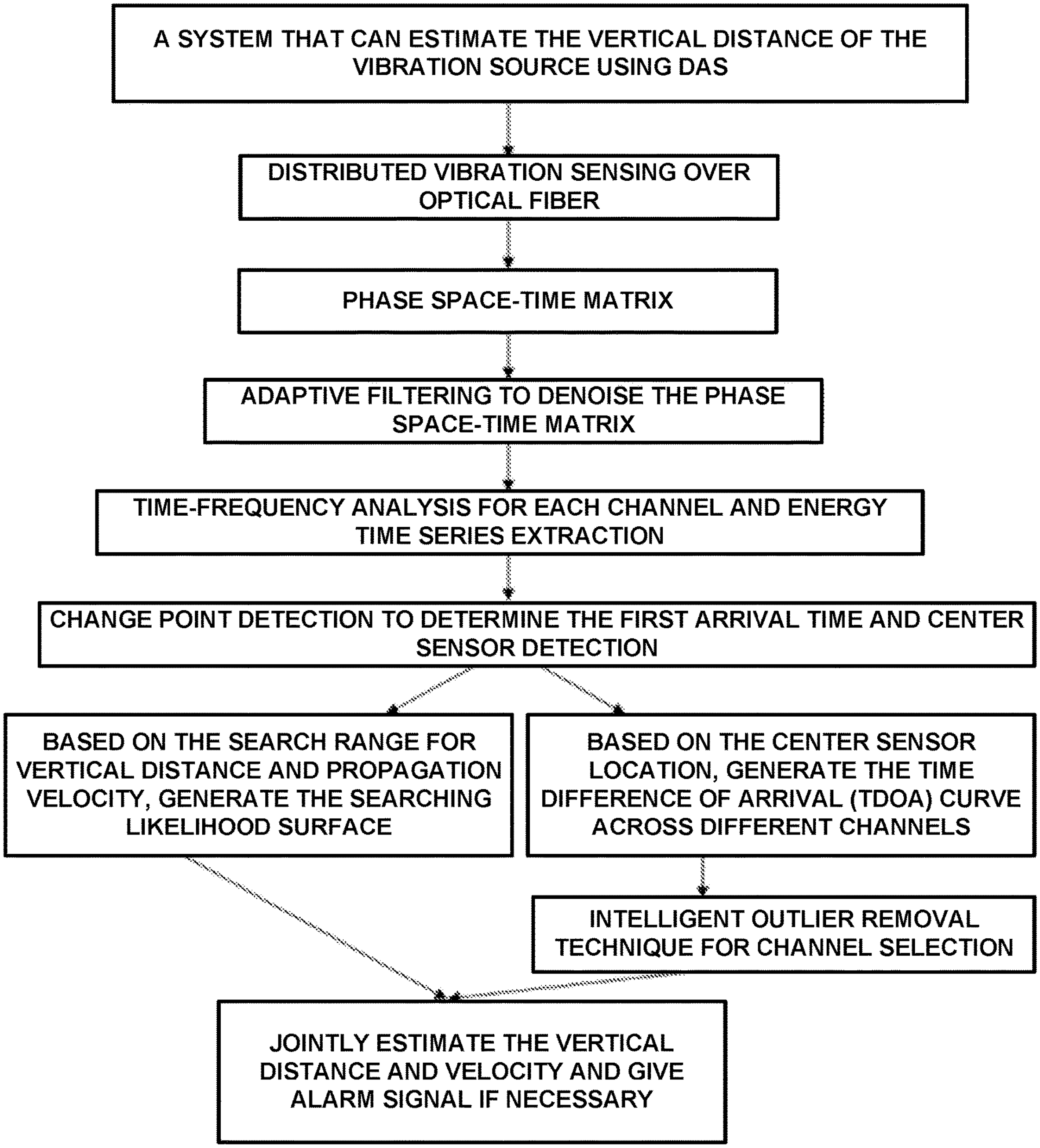
FIG. 14 is a schematic diagram showing illustrative operation of our inventive method according to aspects of the present disclosure.

From FIG. 13(A) and FIG. 13(B), the FAR is reduced when multiple impulses are applied. In practice, machine digging may happen multiple times. Therefore, although localization with only one impulse may be difficult, averaging over multiple impulses may result in a much better performance. This test indicates the proposed method can be robust to velocity uncertainty, source types, and environmental changes FIG. 14 is a schematic diagram showing illustrative operation of our inventive method according to aspects of the present disclosure.

At this point, while we have presented this disclosure using some specific examples, those skilled in the art will recognize that our teachings are not so limited. Accordingly, this disclosure should only be limited by the scope of the claims attached hereto.

The invention claimed is:

1. A source localization cable cut prevention method comprising:

operating a distributed fiber optic sensing (DFOS) system comprising an interrogator and a multi-channel optical sensing fiber deployed in an underground medium;

receiving at the interrogator, backscattered optical signals from the multi-channel optical sensing fiber;

generating, by a hardware processor from the backscattered optical signals, a complex multi-channel space-time matrix comprising phase information across a plurality of sensing channels identifying a vibrational event threatening the optical sensing fiber by performing changepoint detection on the complex multi-channel space time matrix to capture a first arrival time of the vibrational event across the plurality of sensing channels;

determining, from the vibrational event threatening the optical sensing fiber, a location, time, and distance of an impulse event producing the vibrational event by jointly estimating the distance of the impulse event and an unknown underground wave propagation velocity of the underground medium as unknown variables in an optimization framework wherein jointly estimating the distance and the unknown underground wave propagation velocity comprises:

calculating an observed time difference of arrival (TDOA) curve across the plurality of sensing channels relative to a center channel;

calculating a theoretical TDOA curve for each of a plurality of candidate underground wave propagation velocities;

computing a difference between the observed TDOA curve and the theoretical TDOA curves to form a likelihood surface; and identifying the location of the underground wave propagation velocity by determining a minima in the likelihood surface; and signaling an alarm based on the identified location and distance to stop construction activities, thereby preventing physical damage to the optical sensing fiber.

2. The method of claim 1 wherein an impulse source location is determined from time difference of arrival (TDOA) information obtained from the vibration data.

3. The method of claim 2 wherein the time of arrival information is estimated by a spectral domain change point detection that eliminates traffic noises.

4. The method of claim 3 wherein a determination of impulse event location is determined in two steps, a first step based on earliest time of arrival information and a second step based on propagation speed of vibrations.

5. The method of claim 1, further comprising:

executing an ensemble optimization procedure over a plurality of rounds;

wherein each round includes randomly selecting a subset of distributed fiber optic sensing channels for inclusion in the optimization framework; and calculating a point estimate and a confidence interval for the location of the impulse event based on the plurality of rounds.

6. The method of claim 1, further comprising:

applying bandpass filtering and phase unwrapping to the complex multi-channel space-time matrix prior to performing the change point detection.

* * * * *